US010748072B1

(12) United States Patent
Seeger et al.

(10) Patent No.: US 10,748,072 B1
(45) Date of Patent: Aug. 18, 2020

(54) INTERMITTENT DEMAND FORECASTING FOR LARGE INVENTORIES

(71) Applicant: Amazon Technologies, Inc., Seattle, WA (US)

(72) Inventors: Matthias Seeger, Berlin (DE); Gregory Michael Duncan, Bellevue, WA (US); Jan Alexander Gasthaus, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 751 days.

(21) Appl. No.: 15/153,713

(22) Filed: May 12, 2016

(51) Int. Cl.
*G06N 7/00* (2006.01)
*G06N 20/00* (2019.01)

(52) U.S. Cl.
CPC ............. *G06N 7/005* (2013.01); *G06N 20/00* (2019.01)

(58) Field of Classification Search
CPC .......................... G06N 7/005; G06N 99/005
See application file for complete search history.

(56) References Cited

U.S. PATENT DOCUMENTS

| 7,080,026 B2 * | 7/2006 | Singh ................. | G06Q 30/0202 705/7.31 |
| 2016/0260052 A1 * | 9/2016 | Ray .................... | G06Q 10/087 |

OTHER PUBLICATIONS

Silva et al, Dec. 1, 2010, The vector innovation structural time sereies framework: a simple approach to multivariate forecasting, Statistical Modeling Society, vol. 10 issue 4, pp. 353-374 (Year: 2010).*

Koyama et al, Efficient computation of the maximum a posteriori path and parameter estimation in integrate-and-fire and more general state-space models, as archived Jul. 9, 2009, http://www.stat.columbia.edu/~liam/research/pubs/shinsuke-MAPpath.pdf (Year: 2009).*
U.S. Appl. No. 15/458,645, filed Mar. 14, 2017, Andrew Christopher Chud.
U.S. Appl. No. 15/441,896, filed Feb. 24, 2017, Jan Alexander Gasthaus et al.
Xiangrui Meng, et al., "MLlib: Machine Learning in Apache Spark", Journal of Machine Learning Research 17, 2016, pp. 1-7.
Martin Jaggi, et al., "Communication-Efficient Distributed Dual Coordinate Ascent", Retrieved from URL: http://arxiv.org/abs/1409.1458v2, pp. 1-15.
Alexander Alexandrov, et al., "The Stratosphere platform for big data analytics", The VLDB Journal, Published onine May 6, 2014, Springer, pp. 1-26.
Mikhail Bilenko, et al., "Towards Production-Grade, Platform-Independent Distributed ML", Proceedings of the 33rd International Conference on Machine Learning, 2016, pp. 1-5.
Matthias Seeger, et al., "Bayesian Intermittent Demand Forecasting for Large Inventories", 30th Conference on Neural Information Processing Systems (NIPS 2016), 2016, pp. 1-9.
Ronnie Chaiken, et al., "SCOPE: Easy and Efficient Parallel Processing of Massive Data Sets", PVLDB '08, Aug. 23-28, 2008, ACM, pp. 1265-1276.

(Continued)

*Primary Examiner* — Austin Hicks
(74) *Attorney, Agent, or Firm* — Robert C. Kowert; Kowert, Hood, Munyon, Rankin & Goetzel, P.C.

(57) ABSTRACT

With respect to an input data set which contains observation records of a time series, a statistical model which utilizes a likelihood function comprising a latent function is generated. The latent function comprises a combination of a deterministic component and a random process. Parameters of the model are fitted using approximate Bayesian inference, and the model is used to generate probabilistic forecasts corresponding to the input data set.

24 Claims, 10 Drawing Sheets

(56) References Cited

OTHER PUBLICATIONS

Yossi Arjevani, et al., "Communication Complexity of Distributed Convex Learning and Optimization", Retrieved from URL: http://arxiv.org/abs/1506.01900v2, pp. 1-27Tim Kraska, et al., "MLbase: A Distributed Machine-learning System", CIDR 2013, 6th Biennial Conference on Innovative Data Systems Research, pp. 1-7.
Tim Kraska, et al., "MLbase: A Distributed Machine-learning System", CIDR 2013, 6th Biennial Conference on Innovative Data Systems Research, pp. 1-7.
Abhay Jha, et al., "Clustering to Forecast Sparse Time-Series Data", 2015 IEEE 31st International Conference, 2015, pp. 1388-1399.
"ISF 2014 Economic Forecasting-Past, Present and Future", Foresight Fall 2013, Issue 31, The International Journal of Applied Forecasting, 2013, pp. 1-56.
Vinayak Borkar, et al., "Hyracks: A Flexible and Extensible Foundation for Data-Intensive Computing", Data Engineering (ICDE), 2011 IEEE 27th International Conference, pp. 1151-1162.
"KeystoneML", Retrieved from URL: http://keystoneml.org/index.html on Jan. 10, 2017, pp. 1-4.
Arun Kumar, et al., "Model Selection Management Systems: The Next Frontier of Advanced Analytics", ACM SIGMOD, Record 44.4, 2016, pp. 17-22.
Jimmy Lin, et al., "Large-Scale Machine Learning at Twitter", SIGMOD '12, May 20-24, 2012, pp. 793-804.
Amazon Web Services, "Amazon Machine Learning Developer Guide Version Latest", Updated Aug. 2, 2016, pp. 1-146.
CE Zhang, et al., "Materlialization Optimizations for Feature Selection Workloads", SIGMOD '14, Jun. 22-27, 2014, pp. 1-12.
Cheng-Tao Chu, et al., "Map-Reduce for Machine Learning on Multicore", In Advances in Neural Information Processing Systems, 2007, pp. 281-288.
Matei Zaharia, et al., "Resilient Distributed Datasets a Fault-Tolerant Abstraction for In-Memory Cluster Computing", amplab UC Berkeley, 2012, pp. 1-30.
Matei Zaharia, et al., "Resilient Distributed Datasets a Fault-Tolerant Abstraction for In-Memory Cluster computing", Proceedings of the 9th USENIX Conference on Networked Systems Design and Implementation, pp. 1-30.
Matthias Boehm, et al., "Hybrid Parallelization Strategies for Large-Scale Machine Learning in SystemML", Proceeding of the VLDB Endowment, vol. 7, No. 7, 40th International Conference on Very Large Data Bases, Sep. 1-5, 2014, pp. 553-564.
Yucheng Low, et al., "Distributed GraphLab: A Framework for Machine Learning and Data Mining in the Cloud", The 38th International Conference on Very Large Data Bases, Aug. 27-31, 2012, pp. 716-727.

Fabian Pedregosa, et al., "Scikit-learn" Machine Learning in Python, Journal of Machine Learning Research 12, 2011, pp. 2825-2830.
D. Sculley, et al., "Hidden Technical Debt in Machine Learning Systems", In Advances in Neural Information processing Systems, 2015, pp. 2503-2511.
Michael Armbrust, et al., "Spark SQL: Relational Data Processing in Spark", ACM, SIGMOD '15, May 31-Jun. 4, 2015, pp. 1-12.
Amol Ghoting, et al., "SystemML: Declarative Machine Learning on MapReduce", In Data Engineering (ICDE), 2011 IEEE 27th International Conference on, pp. 231-242.
U.S. Appl. No. 14/662,021, filed Mar. 18, 2015, Duncan, et al.
Research Program on Forecasting, "Forecasting the Intermittent Demand for Slow-Moving Items," Snyder, et al., Original Working Paper: May 18, 2010; Revised: Mar. 11, 2011, pp. 1-39. RPF Working Paper No. 2010-003, http://www.gwu.edu/~forcpgm/2010-003.pdf.
Texts: Online, Open-Access Textbooks, "7.1 Simple exponential smoothing," Rob J. Hyndman and George Athanasopoulos, downloaded from https://www.otexts.org/fpp/7/1 on Mar. 14, 2016, pp. 1-11.
Amazon webservices, "Amazon Machine Learning," Developer Guide, Latest Version, API Version Apr. 9, 2015, Last documentation update Mar. 21, 2016, pp. 1-143.
Springer, "Forecasting with Exponential Smoothying; The State Space Approach," Aamazon.com, Hyndman, Koehler and Snyder, 2008, pp. 1-4.
Rasmus Baath's Research Blog, "Easy Laplace Approximation of Bayesian Models in R-Publishable Stuff," Nov. 22, 2013, downloaded from http://www.sumsar.net/blog/2013/11/easylaplaceapproximation/, pp. 1-16.
Ahmed, Nesreen K., et al., Publisher Taylor & Francis, "An Empirical Comparison of Machine Learning Models for Time Series Forecasting," Sep. 15, 2010, pp. 1-29.
Qingzheng xu, "A Review of Croston's method for intermittent demand forecasting," Jan. 1012, IEEE, pp. 468-472.
Nicolas Chapados, "Effective Bayesian Modeling of Groups of Related Count Time Series," Proceedings of the 31st International Conference on Machine Learning, Beijing, China, 2014. JMLR: W&CP vol. 32. Copyright 2014 by the author(s), pp. 1-9.
Christopher M. Bishop, Pattern Recognition and Machine Learning, 2002-2006, Springer 2006, First printing, pp. 1-82, More Info at http://research.microsoft.com/~cmbishop/PRML.
U.S. Appl. No. 15/417,070, filed Jan. 26, 2017, Valentin Flunkert, et al.

* cited by examiner

Price reduction period 220

Out-of-stock interval 222

| Date | Sales |
|---|---|
| ... | ... |
| 29-Feb-16 | 0 |
| 1-Mar-16 | 0 |
| 2-Mar-16 | 1 |
| 3-Mar-16 | 0 |
| 4-Mar-16 | 0 |
| 5-Mar-16 | 2 |
| 6-Mar-16 | 3 |
| 7-Mar-16 | 0 |
| 7-Mar-16 | 0 |
| 9-Mar-16 | 0 |
| 10-Mar-16 | 0 |
| 11-Mar-16 | 0 |
| 12-Mar-16 | 0 |
| 13-Mar-16 | 1 |
| 14-Mar-16 | 0 |
| 15-Mar-16 | 0 |
| 16-Mar-16 | 0 |
| 17-Mar-16 | 0 |
| 18-Mar-16 | 0 |
| 19-Mar-16 | 0 |
| 20-Mar-16 | 0 |
| 21-Mar-16 | 0 |
| 22-Mar-16 | 0 |
| 23-Mar-16 | 1 |
| 24-Mar-16 | 0 |
| 25-Mar-16 | 1 |
| 26-Mar-16 | 0 |
| 27-Mar-16 | 0 |
| 28-Mar-16 | 0 |
| 29-Mar-16 | 0 |
| 30-Mar-16 | 0 |
| 31-Mar-16 | 0 |
| 1-Apr-16 | 0 |
| 2-Apr-16 | 1 |
| 3-Apr-16 | 0 |

Per-day sales time series 202
(for item I1)

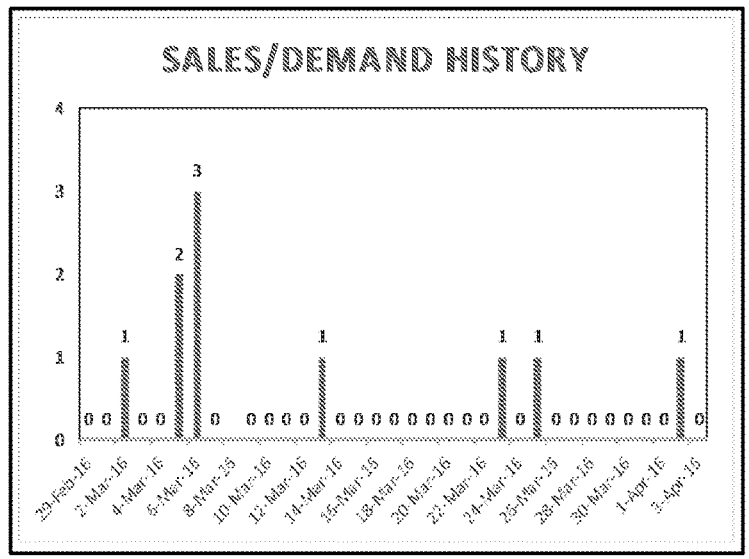

Sales graph 223 (item I1)

| Forecasting request examples 260 |
|---|
| Approximately how many I1s will be sold between May 1 – May 15? |
| Will any I1s be sold on April 15 if a 10% discount is applied? |
| What is the probability of selling three or more I1s on any single day in April or May? |

Forecaster 250

INTERMITTENT DEMAND FORECASTING FOR LARGE INVENTORIES

BACKGROUND

For many kinds of business and scientific applications, the ability to generate accurate forecasts of future values of various measures (e.g., retail sales, or demands for various types of goods and products) based on previously collected data is a critical requirement. The previously collected data often consists of a sequence of observations called a "time series" or a "time series data set" obtained at respective points in time, with values of the same collection of one or more variables obtained for each point in time (such as the per-day sales for a particular inventory item over a number of months, which may be recorded at an Internet-based retailer). Time series data sets are used in a variety of application domains, including for example weather forecasting, finance, econometrics, medicine, control engineering, astronomy and the like.

The statistical properties of some time series data, such as the demand data for products or items that may not necessarily be sold very frequently, can make it harder to generate forecasts. For example, an Internet-based footwear retailer may sell hundreds of different shoes, and for most days in a given time interval, there may be zero (or very few) sales of a particular type of shoe. Relatively few winter shoes may be sold for much of the summer months of a given year in this example scenario. On the other hand, when sales of such infrequently-sold items do pick up, they may be bursty—e.g., a lot of winter shoes may be sold in advance of, or during, a winter storm. The demand for some items may also be correlated with price reductions, holiday periods and other factors. Some traditional prediction approaches, when confronted with time series which consist largely of zero demand values, may be unable to predict non-zero demands with desired accuracy levels, especially for the large lead times which may sometimes be required to replenish the supplies of the items.

In today's competitive environment, the organizations responsible for stocking and selling such intermittent-demand items may be under substantial pressure to ensure that the supplies they maintain of various items are generally sufficient to meet customer needs. Sustained out-of-stock situations may, for example, lead to poor customer satisfaction and consequently to loss of customers. At the same time, the organizations also cannot afford to maintain excessive stocks of infrequently-purchased items—some of the organizations may for example sell millions of items, and the costs of overstocking all the items may quickly become unsustainable. Forecasting demand accurately for intermittently-needed items in a timely and efficient manner may thus present a non-trivial challenge.

BRIEF DESCRIPTION OF DRAWINGS

FIG. 2 illustrates an example of an intermittent demand data set for an item, and examples of forecast-related queries for the item, according to at least some embodiments.

Figure 1:
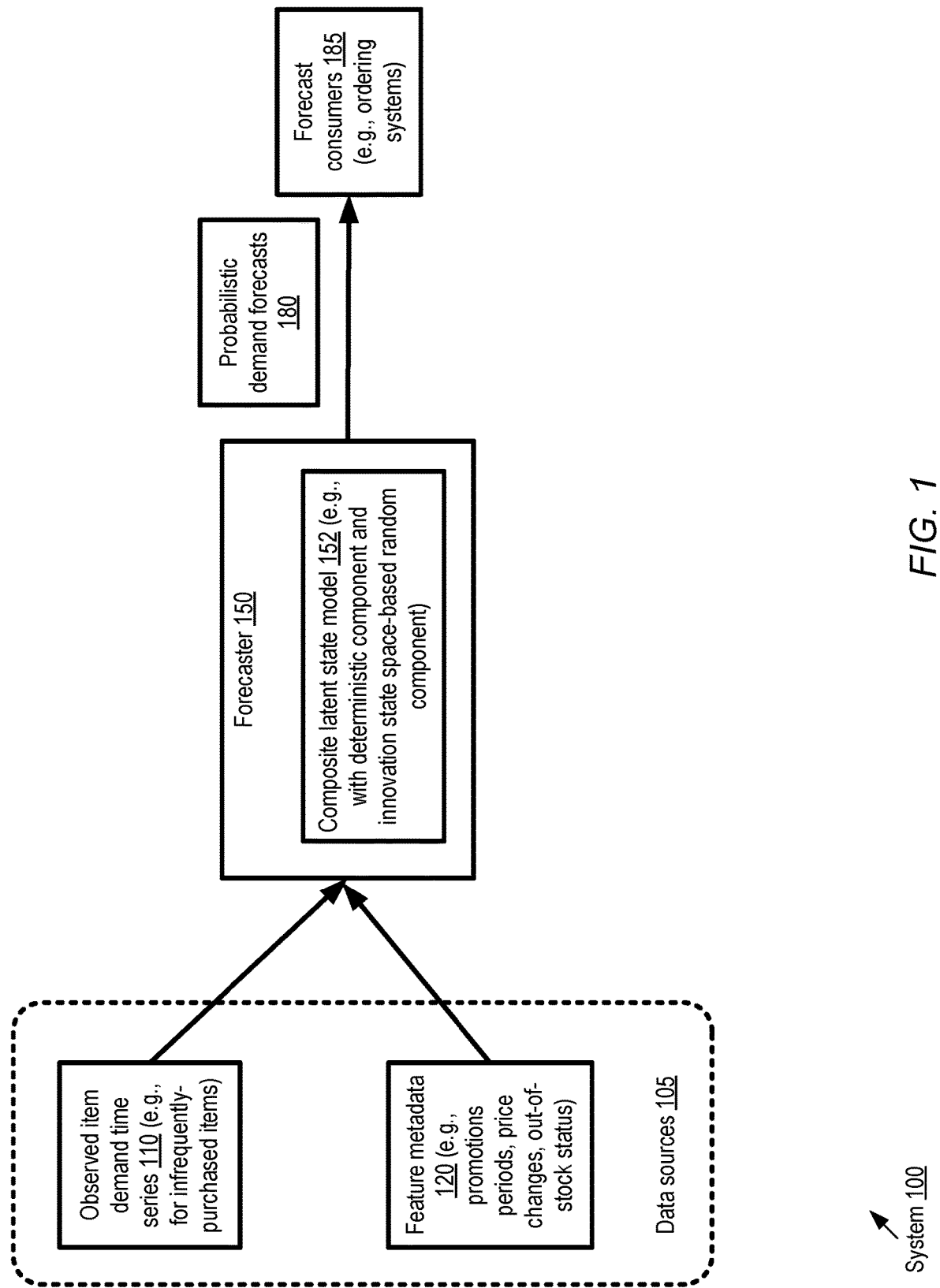
FIG. 1 illustrates an example forecasting system in which probabilistic forecasts for intermittent demand data sets may be generated using composite latent state models, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for intermittent demand forecasting for large data sets are described. The forecasting algorithms described herein may utilize composite latent state models in at least some embodiments. A given composite latent state model may incorporate a combination of deterministic components and random process components. In some embodiments, the deterministic components may comprise linear functions, while in other embodiments, non-linear functions such as deep feedforward neural networks or recurrent neural networks may be used. The algorithms may be implemented at one or more computing devices which may be collectively referred to herein as a forecaster. Such a forecaster may, in some embodiments, be incorporated within a network-accessible forecasting service or a more general machine learning service; in other embodiments, the forecaster may be implemented in a standalone mode and may not necessarily be associated with or part of a network-accessible service. The algorithms outlined herein may be utilized for efficiently generating forecasts for an inventory with hundreds of thousands (or even millions) of items, e.g., using respective nodes of a compute cluster for processing respective subsets of inventory items.

In one embodiment, a forecaster may determine that a particular input data set indicating demand observations for one or more items over a period of time meets an intermittency criterion that makes the data set suitable for a composite latent state model. The criterion may be based, for example, on the fraction of entries in the data set that are zeroes, the temporal distribution of the non-zero entries, and/or on other factors. In addition to the demand values themselves, the forecaster may also obtain feature metadata associated with the data set—e.g., information about special events or holidays which may have affected the demand for an item, the timing of price changes with respect to the item or items, information about time periods during which a given item was out of stock, etc., may be made available to the forecaster. Generally speaking, feature metadata may comprise elements of information that could potentially help explain the variation in demand over time for the item or items being considered, and it may therefore be useful to incorporate the feature metadata into the predictive models used for forecasting.

In various embodiments, the forecaster may generate, with respect to the input data set, a statistical model which utilizes a likelihood function comprising one or more latent functions. At least one latent function may be a combination of a deterministic function and a random process. One such approach may combine, for example, a generalized linear model and probabilistic smoothing. In other embodiments, nonlinear deterministic functions such as various types of neural networks may be used. Generally speaking, the statistical model may utilize either non-Gaussian or Gaussian likelihood functions, with the non-Gaussian likelihoods being most useful for dealing with intermittent data sets. Free parameters of the statistical model may be fitted in some embodiments using approximate Bayesian inference. A number of advanced statistical techniques may be employed in various embodiments as described below to train the model, including for example obtaining Laplace approximations for log likelihood with the help of Newton-Raphson optimization and Kalman smoothing. After the model parameters have been fitted, the model may be run to produce probabilistic demand forecasts—e.g., corresponding to various future times or time intervals, a probability distribution (and not just point predictions) of the demand for a given item may be generated. The probabilistic forecasts may be stored and/or programmatically provided to one or more destinations or recipients in various embodiments.

The results provided by the forecaster may be used to make various types of business decisions more intelligently—e.g., to generate purchase orders for appropriate quantities of items at appropriate times, to decide whether it is worthwhile to continue stocking various items or not, to plan ahead for warehouse space expansions, and so on. In at least some embodiments, the forecasts may be provided as input to an automated ordering system, which may in turn transmit orders for various inventory items to meet business requirements of the organization on behalf of which the forecasts were produced. In some embodiments, the output of the algorithm may be provided to other automated forecast-consuming entities or systems, such as a discount planning system, a facilities planning system, a promotions planning system or a product placement planning system. Using the demand predictions of the algorithm, the discount management system may, for example, make recommendations or decisions regarding if, when, for how long and by how much the price of a particular inventory item should be reduced. A facilities planning system may use the forecasts for managing warehouse space for various products. In some embodiments, data gathered from various sensors (such as cameras or scanners located at various positions in the warehouse or physical store, which can indicate the amount of unused space), information about the packaging and sizes of various products (which may also be obtained via sensors/cameras, or from an inventory database) and the like may be combined with the forecasts for an application that manages warehouse space. A promotions planning system may be able to recommend specific tie-ins with external factors (such as a sale of a particular set of items associated with a release of a motion picture or the staging of a sports event) using the forecasts. A product placement planning system may utilize the forecasts for helping recommend the shelf locations of various items in a physical store, or whether an item should be placed in a shopfront window, for example. In some embodiments, the forecasts may be used to anticipate side effects of future demands, such as increases or decreases in shipping costs, which may influence business contracts with mailing/delivery services and so on. Details of various aspects of the modeling methodology are provided below.

In some embodiments, as mentioned earlier, a given inventory may comprise large numbers (e.g., up to millions) of items, each of which may have respective sets of feature metadata. In order to prepare forecasts for such large data sets, a computation cluster comprising a plurality of execution platforms (e.g., physical or virtual machines) may be employed in some embodiments, with the forecasts for a respective subset of items being processed at each of the execution platforms in parallel. In effect, respective variants of the composite models may be run for individual items using the same underlying methodology, potentially with different feature sets and different initial parameters for individual items. The results of the forecasting may be aggregated in some embodiments for presentation purposes—e.g., while purchasing/ordering decisions may be made at the level of individual items, the probabilistic predictions for numerous items may be combined into easy-to-understand percentile-based graphs or the like.

In one embodiment, the customers or clients on whose behalf the forecasting is being performed may indicate preferences regarding the metrics to be used to rate the quality of the forecasts. For example, one client may programmatically indicate that the accuracy of the median (50th percentile) forecast for T days in the future is of greatest interest, while for another client, the accuracy of the $90^{th}$ percentile forecast for 2*T days of the future may be more important. Based on the input provided programmatically by the clients, the forecaster may evaluate the composite statistical model. The demand observations may be split into a training subset (comprising demands up to some selected time boundary) and a test subset (comprising demands observed after the boundary). Free parameters may be fitted using the training subset and the client-preferred metrics may be used to determine the accuracy of the forecasts for the test subset. If the evaluations indicate that a given model does not meet a desired quality/accuracy criterion, the model may be adjusted in some embodiments—e.g., various initial parameters and/or features may be modified and the model may be retrained. In at least one embodiment, new versions of the models may be generated as new demand observations are obtained. For example, in one implementation, new demand forecasts for K weeks into the future may be generated every week using demand data collected over a time window of the previous N weeks as input for the composite modeling methodology.

Before proceeding to the discussion of algorithmic details, some preliminary information is provided here. The following notation and assumptions may be used in the remainder of this document. Demand for an item may expressed at a per-day granularity to simplify the presentation, although it should be clear that other granularities (such as weeks, hours, etc.) could be used in various embodiments with equal success. In general, each item for which observations are collected may have an associated unique identifier i within a given inventory or input data set. The notation $z_{it}$ may be used to represent the demand, expressed as a non-negative integer, for a given item i and a given day t. Under the assumption that the forecasting-related processing for any given item is independent of the processing for any other item, the index variable i may be dropped from the $z_{it}$ notation in much of the following discussion. That is, the algorithm will be discussed primarily with respect to the demand $z_t$ for a single item at a time.

Generally speaking, a model for estimating forecasts may be defined by a likelihood $P(z_t|y_t)$ and the latent function $y_t$. In one standard approach towards count data, the Poisson likelihood function may be employed:
Equation E1:

$$P_{poi}(z \mid y) = \frac{1}{z!} \lambda(y)^z e^{-\lambda(y)}, z \in \mathbb{N}$$

In this function, the rate $\lambda(y)$ depends on y through a link function. However, the Poisson likelihood may not work well for intermittent bursty data sets—where many $z_t$ are zero and a few $z_t$ are large. Accordingly, a multi-stage generalization of the Poisson likelihood may be used in some scenarios, which represents the probabilities for z={0, 1} exactly and may therefore be better suited for intermittent data. The multi-stage generalization may be expressed as follows:
Equation E2:

$$P(z \mid \{y^{(k)}\}) = P_{poi}(z-2 \mid y^{(2)})^{I_{\{z \geq 2\}}} \prod_{k=0}^{1} \sigma(\tilde{z}_k y^{(k)})^{I_{\{z \geq k\}}}$$

In equation E2, $$\tilde{z}_k = I_{\{z=k\}} - I_{\{z>k\}}$$

and $\sigma(u) := (1+e^{-u})^{-1}$ is the sigmoid function. A variant of a generalized linear model (GLM) using a linear latent function $y_t = x_t^T w$ and the multi-stage generalization of the Poisson likelihood as per equation E2 may be generated. The features included in $x_t$ may include, for example, the holiday-related, seasonal, price-change and other metadata discussed above, and the weights w may be learned by maximizing the training data likelihood. However, even this approach may have several drawbacks. For example, the GLM variant may lack temporal continuity, and may sometimes be outperformed by a straightforward exponential-decay based smoother. Furthermore, it may neglect temporal correlations and may produce unrealistic forecast distribution whose widths do not increase over time.

Accordingly, in at least some embodiments, a composite modeling approach that combines GLMs with exponential smoothing and non-Gaussian likelihood functions as per the following set of equations may be employed. Equation set E3 may be referred to as an innovation state space model (ISSM).
Equation Set E3:

$$y_t = a_t^T l_{t-1} + b_t$$

$$b_t = w^T x_t$$

$$l_t = F l_{t-1} + g_t \varepsilon_t, \varepsilon_t \sim N(0,1)$$

Here, $b_t$ is the deterministic function known from the GLM, and $l_t$ is a latent state. This ISSM is defined by $a_t$, $g_t$ and F, as well as the prior $l_0 \sim P(l_0)$. As indicated by their subscripts, both $a_t$ and $g_t$ may vary over time, which makes the model more general and more expressible than if these two parameters were invariant with respect to time. The time variation of $a_t$ and $g_t$ may help with use cases in which demand varies seasonally and/or innovation variance changes over time.

In some embodiments, a link function referred to as a "twice logistic" link function may be used with the GLM. The logistic function (on which this twice logistic function is based) may be defined as:

$$g(x) = \log(1+e^x)$$

In the logistic function, the value of g(x) is positive for all x, and g(x) approaches x for large positive values of x. The twice logistic link function may be defined as:)

$$\lambda(y) = g(1 + \kappa^* g(y))$$

where κ is a constant (e.g., 0.0005) whose value may be selected based on experimentation. Commonly-employed link functions, such as $\lambda(y) = g(y)$, or $\lambda(y) = e^y$ may not work well for intermittent data sets, and may even lead to the failure of the model in some cases.

To begin with, it may help to focus on a simple scenario where the following hold:

$$y_t = l_{t-1} + b_t,$$

$$l_t = l_{t-1} + \alpha \varepsilon_t \text{ and}$$

$$l_0 \sim N(\mu_0, \sigma_0^2)$$

In this simple scenario, with respect to equation set E3, F=[1], $a_t$=[1], $g_t$=[α], and the latent state contains a level component only. The free parameters are w (the weights), α>0, and $\mu_0$, $\sigma_0$ of $P(l_0)$, collected in a vector θ.

As part of training the composite model, the elements of vector θ may be learned by maximizing the likelihood of the observations [$z_t$] for t=1, ..., T in various embodiments. This means that the latent (unobserved) variables $$S = [\varepsilon_1, \ldots, \varepsilon_{T-1}, l_0]$$

have to be integrated out. Since the likelihood $P(z_t|y_t)$ is not Gaussian, a Laplace approximation technique may be used. The exact (computationally intractable) log likelihood is:

$$\log P(z|\theta) = \log \int P(z,s|\theta) ds$$

The Laplace approximation may be implemented in two steps in at least some embodiments. First, the mode of the posterior may be found: ŝ=argmax log P(z,s|θ). This first step may be referred to herein as the inner optimization problem. Then, the term −log P(z,s|θ) may be replaced by its quadratic Taylor approximation at the mode. The criterion to replace the negative log likelihood is:

$$\psi(\theta) := -f e^{-f(s;\theta)} ds$$

For log-concave $P(z_t|y_t)$ and a linear innovation state space model such as the ISSMs used in various embodiments, the inner optimization is a convex problem. The Newton-Raphson optimization algorithm may be used for the inner optimization problem in at least some embodiments. As used in such embodiments, the Newton-Raphson method iterates between fitting the current criterion by its local second-order approximation and minimizing the quadratic surrogate. For the former step, $y_t$ values may be computed in a forward pass, and then the potentials $P(z_t|y_t)$ may be replaced by $N(\tilde{z}_t|y_t, \sigma_t^2)$, where the values $z_t$ and $\sigma_t^2$ are determined by the second order fit. This last step amounts to computing the posterior mean (equivalent to the mode) of the resulting Gaussian-linear model. This inference problem may be solved by a variant of Kalman smoothing in at least some embodiments. Kalman smoothing is a robust algorithm which scales linearly with the sequence length T. The use of the Newton-Raphson algorithm as described may lead to much faster convergence than the use of some alternative approaches. The basic Newton-Raphson algorithm may be enhanced in at least some embodiments. For example, in one embodiment a line search procedure (such as a backtracking Armijo line search) may be used and/or a non-zero starting point so may be identified using heuristics.

As mentioned above in the context of equation set E3, in some embodiments the latent state may comprise only a level component. In other embodiments, the latent state may include both a level component and a growth component. In such an embodiment, the sum of the previous day's level and growth components may be used to make a prediction for a given day, and a damping parameter may be used for the growth component.

It is noted that although, in much of the remainder of this document, demand data sets are used as the examples of intermittent data for which forecasts are generated using the composite modeling methodology, the techniques may be used for any data sets which exhibit similar characteristics (e.g., frequent zero values, decreasing number of occurrences as values increase, bursty behavior). That is, at least in some embodiments, the modeling methodology need not necessarily be restricted to predicting future demands for goods or items, but may be employed for predictions with respect to intermittent data sets that represent other types of observed phenomena.

In various embodiments, the composite modeling methodology described herein may be highly scalable, e.g., orders of magnitude faster than alternative approaches such as Markov Chain Monte Carlo (MCMC) algorithms running on comparable execution platforms. MCMC algorithms may also be much more difficult to use for non-experts—for example, when to stop an MCMC algorithm may not be clear to non-experts, while the composite modeling algorithm may stop on its own accord, without requiring explicit termination commands or requests to be provided by the user. The composite modeling methodology may reduce computations associated with the search for the posterior mode and the gradient computation for the log likelihood to calling Kalman smoothing several times. For at least some data sets, the Kalman smoothing based approach may result in 10× (or more) speedup compared to several standard optimization algorithms. Furthermore, the use of the Newton-Raphson technique may result in much more reliable convergence than with alternative approaches. The reliable convergence characteristic may make the algorithm robust (helping to avoid expensive model failures when used on very large data sets) and easy to use for non-experts (since, as mentioned above, a decision by a non-expert as to when to stop the algorithm may not be required). The use of multi-stage likelihood and the twice-logistic link function discussed above may also help make the composite modeling algorithm much more successful for forecasting with respect to intermittent data than alternative approaches. The combination of ease-of-use, robustness, and low consumption of compute resources relative to alternative algorithms may make the composite modeling methodology especially suitable for deployment in an automated learning environment, such as the machine learning service environment described in further detail below. For example, customers of machine learning service may sometimes be billed based on the computation resources consumed, so an efficient algorithm such as the one described herein may become extremely popular due to reduced costs.

Example System Environment

FIG. 1 illustrates an example forecasting system in which probabilistic forecasts for intermittent demand data sets may be generated using composite latent state models, according to at least some embodiments. As shown, system 100 may comprise three broad categories of components: data sources 105, a forecaster 150 and one or more forecast consumers 185.

Data sources 105 may include at least one source from observed item demand time series 110 for some set of items may be obtained, and one source from which feature metadata 120 may be obtained. For example, if the forecasting system 100 is being used by a large-scale online retailer, the time series 110 may correspond to recorded purchases at one or more web sites of the retailer. The feature metadata 120 may itself be collected from a plurality of entities—e.g., information regarding price changes or sale periods may be obtained from a pricing database and/or a marketing/promotions database, out-of-stock information may be obtained from an inventory database, holiday-related information may be obtained from geographic-region-specific calendars, and so on. In some embodiments, the demand time series and/or the feature-related information may be provided periodically in the form of batch updates (e.g., once a week or once every three days) to the forecaster 150, e.g., via a set of programmatic interfaces exposed by the forecaster. In other embodiments, fresh demand information and/or fresh feature metadata may be provided to the forecaster as soon as it becomes available, and the forecaster 150 may be responsible for discretizing or batching the data to make its predictions.

Generally speaking, the forecaster 150 may comprise one or more computing devices collectively configured to implement a set of forecasting algorithms and models. A variety of statistical models may be supported in different embodiments, including for example composite latent state models 152 of the kind described earlier, which incorporate both deterministic components and random processes. As mentioned earlier, in some embodiments the deterministic components may be linear functions, while in other embodiments nonlinear deterministic functions such as neural networks may be employed. The particular type of model which is to be trained and/or tested may be selected in some embodiments based on the characteristics of the time series demand data—e.g., a subcomponent of the forecaster may examine some subset of the time series records to determine whether the data set meets intermittency criteria. At least in some embodiments, the composite latent state modeling methodology may be employed specifically for data sets that meet the criteria; for other data sets, simpler algorithms which do not necessarily combine linear components and exponential smoothing in the manner discussed above may be used. Decisions regarding the number of distinct latent state functions to be used in the model may be made by the forecaster in some embodiments, e.g., based on heuristics or knowledge base entries and/or based on customer preferences. In some embodiments, in a preliminary phase of the analysis, a large data set (e.g., corresponding to an inventory with millions of items with respective demand observations) may be split up into partitions, and respective partitions may be assigned to respective nodes of a cluster of execution platforms which are available to or part of the forecaster 150.

With respect to an intermittent demand data set for which the composite modeling methodology outlined above is selected, a number of free parameters of the selected model may be fitted, e.g., using approximate Bayesian inference in at least some embodiments. A two-step Laplace approximation may be implemented, for example, with the first step comprising an inner optimization to determine the mode of the posterior, and the second step comprising replacing a negative logarithmic term with its quadratic Taylor approximation at the mode. In some implementations, a Newton-Raphson algorithm may be used, and/or a Kalman smoothing step may be employed. A number of iterations of training, testing and evaluation may be performed for the composite model in some embodiments, with initial settings and/or other model parameters or hyper-parameters being adjusted between the iterations as needed based on the accuracy of the predictions with respect to test data sets that were not used for training.

After the model has been fitted by the forecaster 150, probabilistic predictions for future demand may be generated. The forecasts may, for example, include confidence intervals. The uncertainty of the forecasts may tend to widen as the lead time (the interval between the last of the observations used for testing/training, and the time period for which forecasts are produced) increases. The probabilistic forecasts 180 may be provided programmatically to one or more forecast consumers 185. In some embodiments, for example, the forecasts may be transmitted to an automated ordering system via one or more application programming interface (APIs), and the projections of the forecast may be used to place orders for various items. In at least one embodiment, the forecasting results may be exposed via one or more user interfaces (e.g., web-based portals, graphical user interfaces, command-line interfaces or the like) to customers of the forecasting system, who may be permitted to submit queries of various kinds and obtain the results via the interfaces. In at least some embodiments, feedback received from the forecast consumers 185 via programmatic interfaces may be used to adjust some of the operations performed by the forecaster. In one embodiment, a customer may submit programmatic forecast requests indicating preferences for various aspects of the forecaster's operations, as discussed below in further detail with respect to FIG. 9.

Intermittent Demand Data Set Example

FIG. 2 illustrates an example of an intermittent demand data set for an item, and examples of forecast-related queries for the item, according to at least some embodiments. Time series 202 shows example per-day sales for an item I1 over a 35-day time period which may be obtained by a forecaster 250. The per-day sales are also plotted in graph 223. The majority of the sales (28 out of the 35 observations) are zero—that is, no purchases of item I1 are recorded on most days. On five days, a single instance of item I1 is sold, and more than one instance was sold only on two days.

In addition to the raw sales/demand data, some metadata (which may potentially have some explanatory role regarding the sales of I1 on at least some days) may also be made available to forecaster 250 in the depicted embodiment. For example, with respect to the time period between March 4 and March 6, the metadata may indicate that a temporary price reduction for I1 was in effect, and this may have had some bearing on the increased sales on March 5 and March 6. In addition, forecaster 250 may also be informed programmatically that item I1 was out of stock on March 14 and March 15, which means that there could not have been non-zero sales on at least those days even if there was non-zero customer demand.

Since most of the time there are zero sales of I1, the data set 202 may meet the forecaster 250's intermittency criterion for the use of a composite model which incorporates both a deterministic component and a random process. Table 260 shows a few examples of the kinds of queries regarding future I1 demand that may be posed programmatically to the forecaster 250. Some customers may want to know how many total sales should be expected to occur in a given data range. Others may want to know how much a particular discount might affect sales, or the probability of selling a particular number of instances of I1 on a single day. In at least some embodiments, programmatic interfaces that allow customers to submit forecast queries similar to those shown in FIG. 2 may be implemented. In one embodiment, natural language query interfaces may be supported; in another embodiment, a query interface based on a variant of the structured query language (SQL) may be supported. It is noted that it may not always be possible for the forecaster to provide responses to some queries with a very high confidence level, despite the use of the composite model in various embodiments. However, in many cases, and at least at the aggregate level (when taking many different items of an inventory into account), high-confidence responses may be provided for various types of forecasting queries.

Probabilistic Forecast Example

Figure 3:
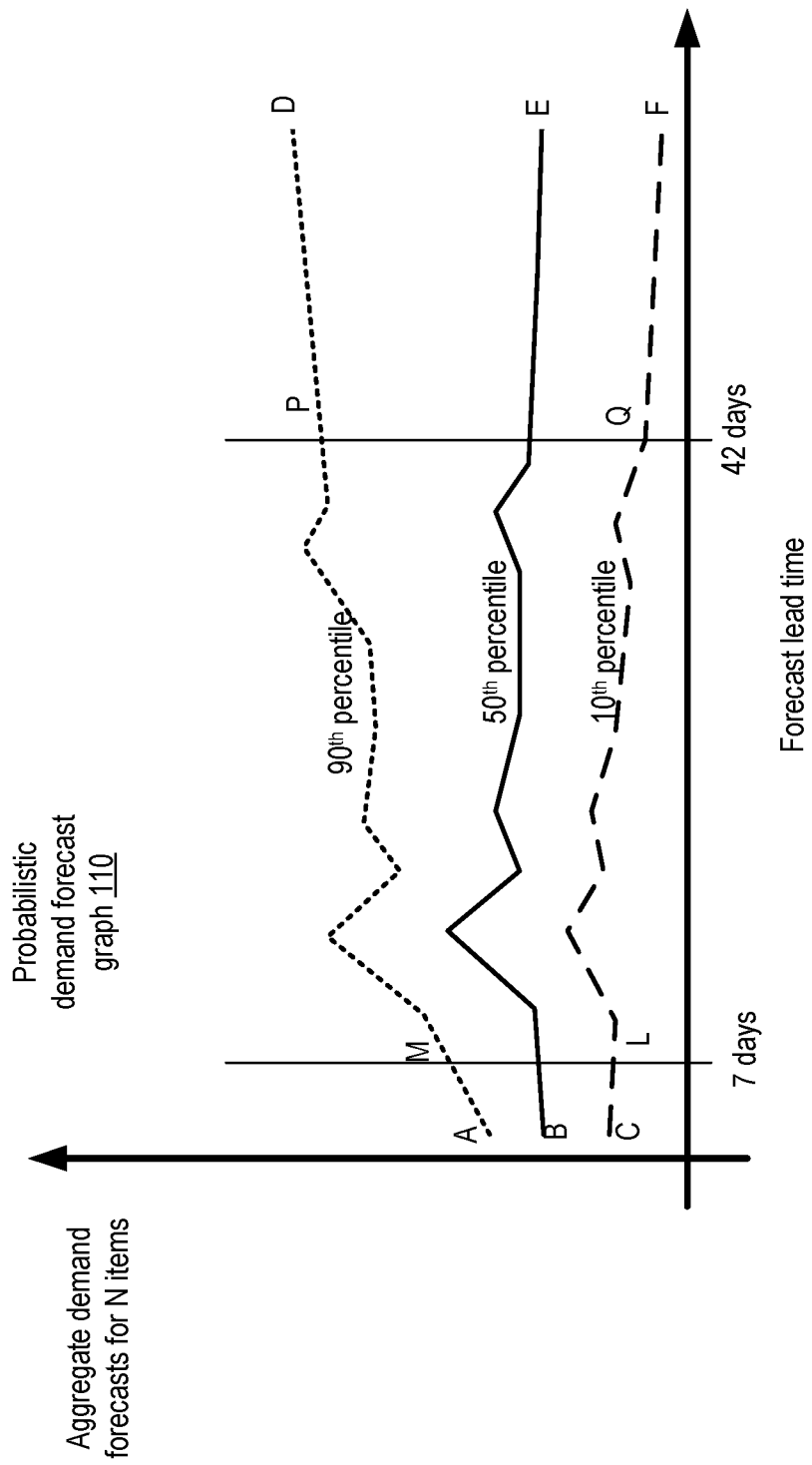
FIG. 3 illustrates an example of a probabilistic aggregate forecast graph which may be produced by a forecaster using a composite latent state model, according to at least some embodiments.

FIG. 3 illustrates an example of a probabilistic aggregate forecast graph which may be produced by a forecaster using a composite latent state model, according to at least some embodiments. In the depicted embodiment, forecast lead time (i.e., the difference between the time for which the forecast is to apply, and the time when the forecast is predicted) increases from left to right on the X-axis of graph 310, and the lead time is expressed in days. The aggregated demands for some number N of items of an inventory increases along the Y-axis.

The aggregated demand curves AMPD, BE, and CLQF correspond respectively to a $90^{th}$ percentile confidence level, a $50^{th}$ percentile confidence level, and a $10^{th}$ percentile confidence level with regard to the demand for the N items considered collectively, obtained using a composite statistical model of the kind described above. Individual per-item demand curves for each item of the inventory may also be provided in at least some embodiments. Such individual-item curves may also consist mostly of zeros as in the case of data set 202 of FIG. 2. In at least some embodiments, a programmatic interface (e.g., a web-based console or a graphical user interface) used to display probabilistic demand graphs such as graph 310 may also include controls to switch between aggregated graphs and individual per-item graphs, or to change the scale of the aggregation (e.g., by providing graphs for K items at a time instead of all N items of the inventory).

As indicated by the relative widening of the gap between the $10^{th}$-percentile and $90^{th}$-percentile curves as the lead time increases, the uncertainty of the forecast produced using the composite modeling approach may increase as time periods further in the future are considered. For example, 7 days in the future, the gap between the $90^{th}$ percentile and the $10^{th}$ percentile corresponds to the length of segment ML, while 42 days in the future, the gap corresponds to the longer segment PQ. In some embodiments, forecast customers may be able to programmatically indicate the particular confidence levels for which they wish to view forecasts.

Forecaster Subcomponents

Figure 4:
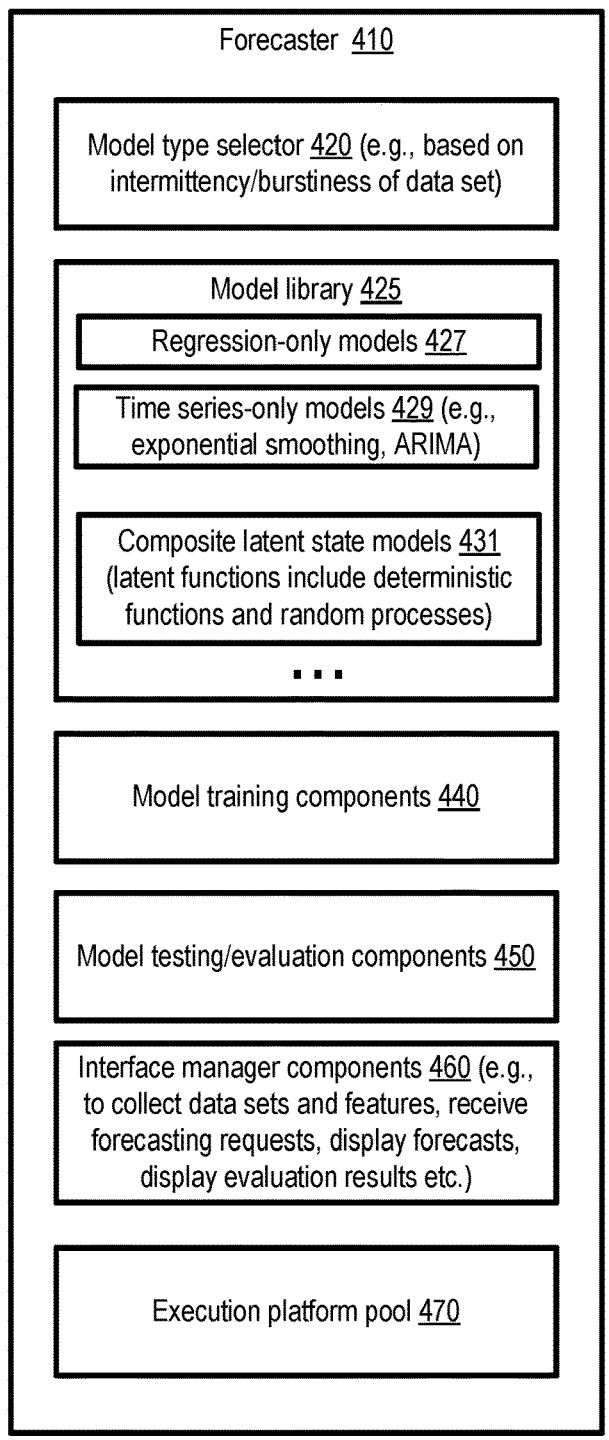
FIG. 4 illustrates example subcomponents of a forecaster, according to at least some embodiments.

FIG. 4 illustrates example subcomponents of a forecaster, according to at least some embodiments. As shown, forecaster 410 may comprise a model type selector 420, a model library 425, model training components 440, model testing/evaluation components 450, interface management components 460, and an execution platform pool 470 in the depicted embodiment.

The model type selector 410 may, for example, examine at least a portion of a time series data set for which forecasts are to be made, and identify the particular modeling methodology or methodologies to be employed. Depending on resource constraints and other factors, in some embodiments a decision may be made to use utilize more than one modeling methodology for the same input data set. In some cases, for example, in which a fairly sophisticated methodology such as the composite modeling approach is selected for a given data set based on intermittency criteria, a simpler modeling technique (e.g., one based solely on exponential smoothing) may also be employed to produce a baseline set of forecasts in addition to the forecasts made using the sophisticated approach. The results of the simpler baseline forecasting may be used, for example, as a sanity check with respect to the results of the composite modeling approach.

The model library 425 may support a variety of modeling techniques with different levels of sophistication and resource requirements. For example, regression-only models 427, time-series-only models 429 (such as exponential smoothing models or autoregressive integrated moving average (ARIMA) models), as well as composite latent state models 431 of the kind discussed earlier may be available.

A given data set (obtained for example using a set of programmatic interfaces for which interface manager components 460 are responsible) may typically be divided into a training subset and a test subset in the depicted embodiment. For example, if a demand time series comprises 400 daily observation records, it may be split into a 300-record training subset representing the first 300 observations and a 100-record test subset comprising the 100 most-recent observations. The model training components 440 may be responsible for coordinating the fitting of free parameters using the training subset and some number of execution platforms of pool 470. The model testing/evaluation components 450 may be responsible for obtaining predictions with respect to the test subset using a trained/fitted variant of the model, determining the accuracy of the predictions (e.g., using any of a variety of metrics such as the mean absolute error). Multiple iterations of training and testing may be performed in various embodiments, with the iterations differing from one another in initial parameter settings, hyperparameter values, the training and test subset populations, and so on.

Interface manager components 460 may be responsible for interactions with external entities such as the customers interested in the forecasting results, the data sources from which the input data is obtained, automated ordering systems which may generate orders for re-stocking items based on the forecasts, and so on. A variety of programmatic interfaces may be implemented in different embodiments, including for example web pages or web-based consoles, graphical user interfaces that are not web-based, command-line tools, application programming interfaces and the like.

The execution platform pool 470 may comprise a number of virtual and/or physical machines in various embodiments. In some embodiments, at least some of the platforms may be organized as nodes of a cluster, with a built-in infrastructure for load balancing, scaling up and down as the workload level changes, fault-tolerance (e.g., using automated failover) and the like. As mentioned earlier, in at least one embodiment the computations associated with forecasting for different subsets of a large inventory may be distributed among different nodes of an execution platform cluster.

Methods for Generating Intermittent Demand Forecasts

Figure 5:
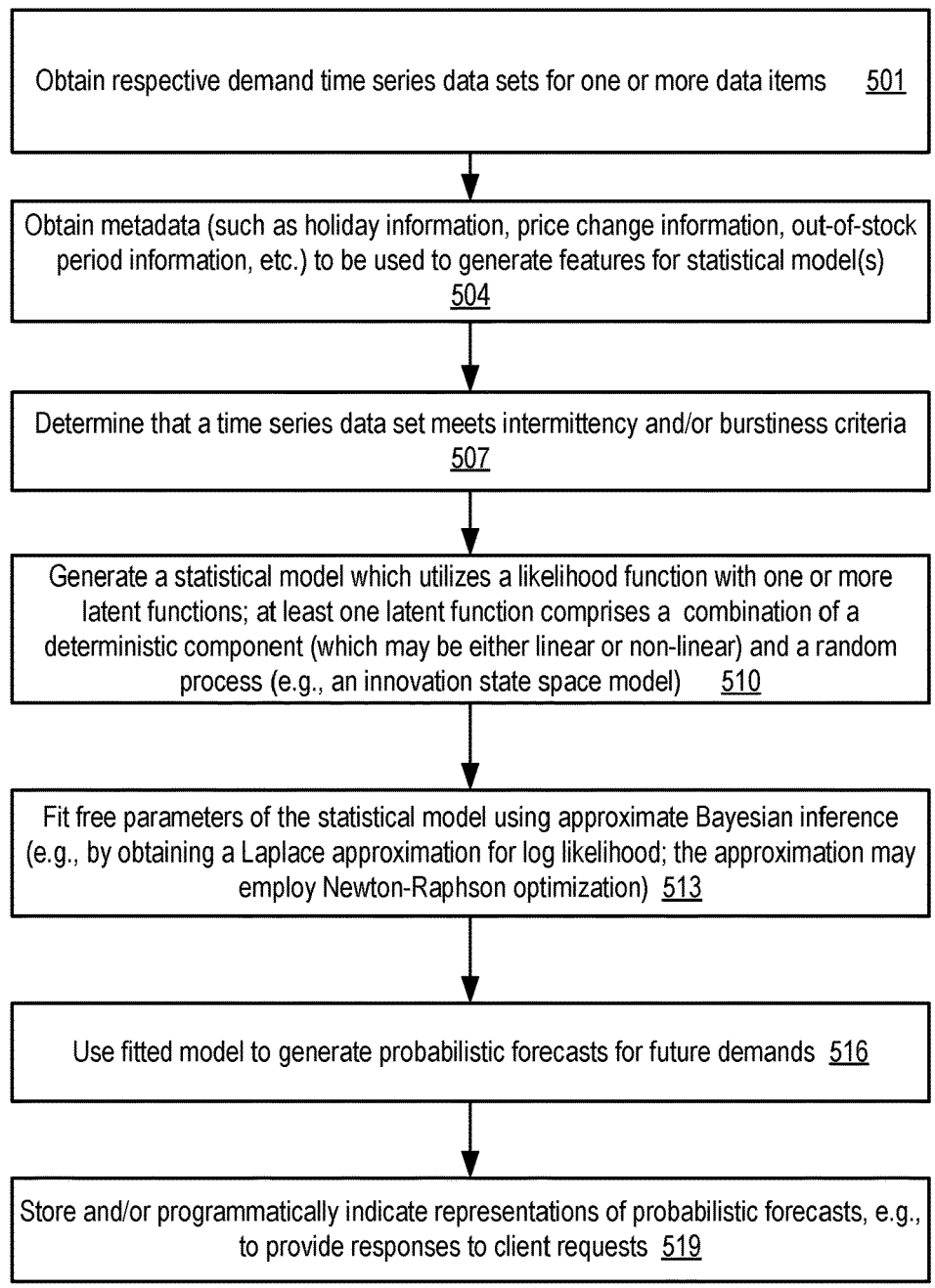
FIG. 5 is a flow diagram illustrating aspects of operations that may be performed by a forecaster for intermittent demand data sets, according to at least some embodiments.

FIG. 5 is a flow diagram illustrating aspects of operations that may be performed by a forecaster for intermittent demand data sets, according to at least some embodiments. As shown in element 501, respective demand time series data sets for one or more items may be obtained at a forecaster from one or more data sources. In addition to the raw data, metadata that can be incorporated as statistical model features, such as holiday-related information, price-change-related information, out-of-stock period related information, and the like may also be obtained in the depicted embodiment (element 504).

With respect to a particular time series data set, a determination may be made that the data meets intermittency and/or burstiness criteria which make it suitable for a modeling methodology which combines elements of linear regression-type models and time-series modeling approaches (element 507). Accordingly, a statistical model which includes such elements, e.g., a model which can be represented using equations similar to equation set E3 discussed above may be generated (element 510). The model may utilize a likelihood function with one or more latent functions in the depicted embodiment, including at least one latent function with a deterministic component and a random process component. The random process component may, for example, comprise an innovation state space model (ISSM). Free parameters of the statistical model may be fitted using approximate Bayesian inference (element 513). A Laplace approximation for the log likelihood may be obtained, e.g., with the help of the Newton-Raphson optimization algorithm.

After the parameters are fitted, the model may be used to obtain probabilistic demand forecasts (elements 516). The probabilistic forecasts, which may for example include respective ranges for different confidence levels, may be stored and/or provided programmatically to one or more forecast consumers (element 519), e.g., in the form of responses to client requests.

In some embodiments, several different latent functions may be used in the composite statistical model for intermittent data. At least for some data sets, such a modification to the base composite modeling algorithm may be particularly useful for improving prediction accuracy at percentiles (such as the $80^{th}$ or $90^{th}$ percentile) relatively further away from the median ($50^{th}$ percentile). Each latent function may be said to correspond to a different "stage". The multi-stage likelihood may factorize in different stages, so different free parameter vectors $\theta_{(k)}$ may be learned separately for each stage k. In a scenario comprising a total of K states from stage k=0 to stage k=(K−1), stages k=0 through k=(K−2)

may be binary classification stages, while the final stage may be a count regression (Poisson) stage. An index $I_k$ for stage k may be defined as follows:

$$I_k := \{t | z_t \geq k\}$$

Using this definition for $I_k$, t may be said to be "active" at stage k if and only if t is an element of $I_k$. In effect, each of the k latent functions $y_k^{(k)}$ may be used for explaining $z_t$ if and only if t is an element of $I_k$ and, as such, meets an activity criterion for stage k. In various embodiments, one or more multi-stage modes may be defined to take into account the fact that at least some t are not active for stages with k>0.

In one such multi-stage mode, termed the "bridge" mode, innovation state space models may be used for all the elements of the time series and for all k. Innovation state space models may be used in the bridge mode for all the elements of the time series and for all k. However, if t is not an element of $I_k$ for a particular k>0, $y_t^{(k)}$ may be considered unobserved, in that no potential is associated with t.

In another multi-stage mode, termed the "chain" mode, a different approach may be taken for stages k>0. In effect, a transformed time series may be obtained for each k>0, in which the time line is condensed by removing those elements for which t is not an element of $I_k$. Consider a simple example in which the k=0 stage time series data $TS_{orig}$ comprises the following elements in the order shown: {0, 0, 0, 1, 0, 0, 1, 2, 0, 0, 1, 3}. For stage k=0, a binary classification decision may comprise determining whether a given entry is zero or non-zero, with the binary classification results {0, 0, 0, 1, 0, 0, 1, 1, 0, 0, 1, 1, 1}. In the chain mode, the condensed/transformed time series for stage k=1 may comprise {1, 1, 2, 1, 3} (the entries of the original time series which are >=k and therefore meet the activity criterion), the transformed time series for stage k=2 may comprise {2,3}, and so on.

For the multi-stage analysis, the details of the training and prediction operations for stages with k>0 may differ based on the mode in various embodiments, while the operations performed for stage k=0 may be identical. With respect to the bridge mode, both Kalman smoothing and mode finding (Laplace approximation) are adapted to missing observations, so the operations described earlier for the single-stage approach may be used without problems for k>0 stages as well. When making predictions in the bridge mode scenario, $y_{T+t}^{(k)}$ may be sampled for all t. With respect to the chain mode, the data may be condensed before training. When making predictions in the chain mode, the active indices may be random (as they depend on choices made in the previous stage) and $y_{T+t}^{(k)}$ may be sampled only for active t.

The multi-stage modes introduced above may have respective advantages and disadvantages relative to each other. For example, the bridge mode may be the more computationally expensive of the two, as it does not involve condensation of time series data. However, the bridge mode may be more easily visualized, as the latent functions are defined everywhere. Furthermore, the bridge mode may be more amenable to extensions for seasonality factors and the like, and it may be more straightforward to draw posterior samples from the training range when the bridge mode is used. The chain mode may introduce artificial discontinuities, which in turn may lead to overestimation of residual variance. In at least some embodiments, whether multi-stage or single-stage modeling is to be used, or both are to be used, may depend on various factors such as the amount of computation resources available. The decision as to whether single-stage modeling, multi-stage modeling or both single-stage modeling and multi-stage modeling are used for a given input data set may be made by the forecaster and/or by the client on whose behalf the forecaster is being utilized. For multi-stage models, the value of k and/or the particular mode (or modes) to be employed for a given forecast and input data set may be selected by the forecaster based on heuristics and/or based on guidance received from the client.

Figure 6:
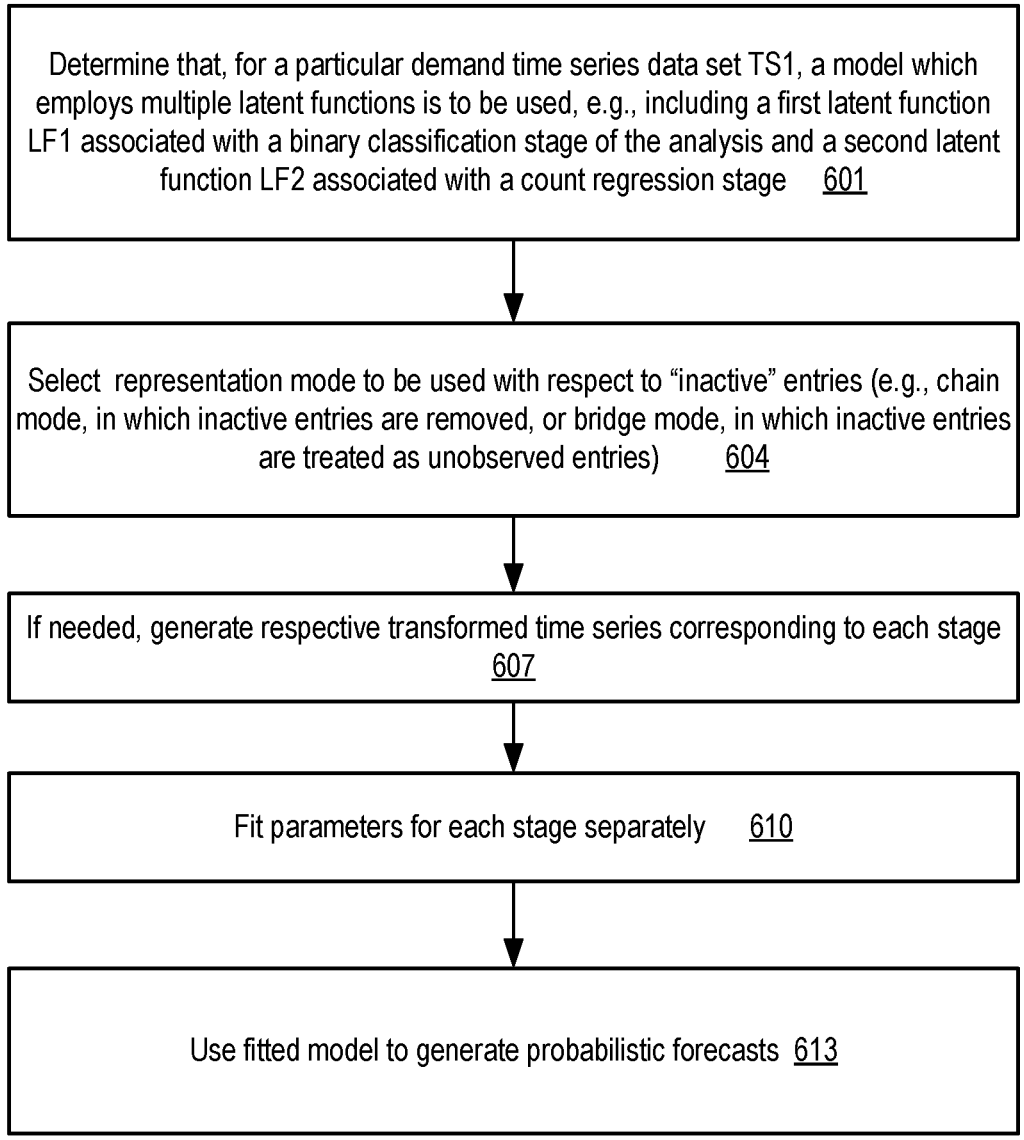
FIG. 6 is a flow diagram illustrating aspects of operations that may be performed to generate forecasts using multiple latent functions, according to at least some embodiments.

FIG. 6 is a flow diagram illustrating aspects of operations that may be performed to generate forecasts using multiple latent functions, according to at least some embodiments. As shown in element 601, a determination may be made that, for a given time series data set TS, a model with multiple latent functions is to be used, including at least one binary classification stage (associated with a first latent function LF1) and at least one stage involving count regression (associated with a different latent function LF2). A value for the total number of stages K may be selected.

A representation mode for inactive entries (where inactive entries are defined using an index similar to $I_k$ discussed above) may be selected—e.g., from among a set of modes which includes the bridge mode and the chain mode discussed above (element 604). Depending on the selected mode, it may be the case that transformed/condensed time series may be generated for stages k>0 (element 607). Free parameters may be fitted for each stage separately (element 610). The fitted model may then be used to generate probabilistic forecasts corresponding to the input data set (element 613).

Figure 7:
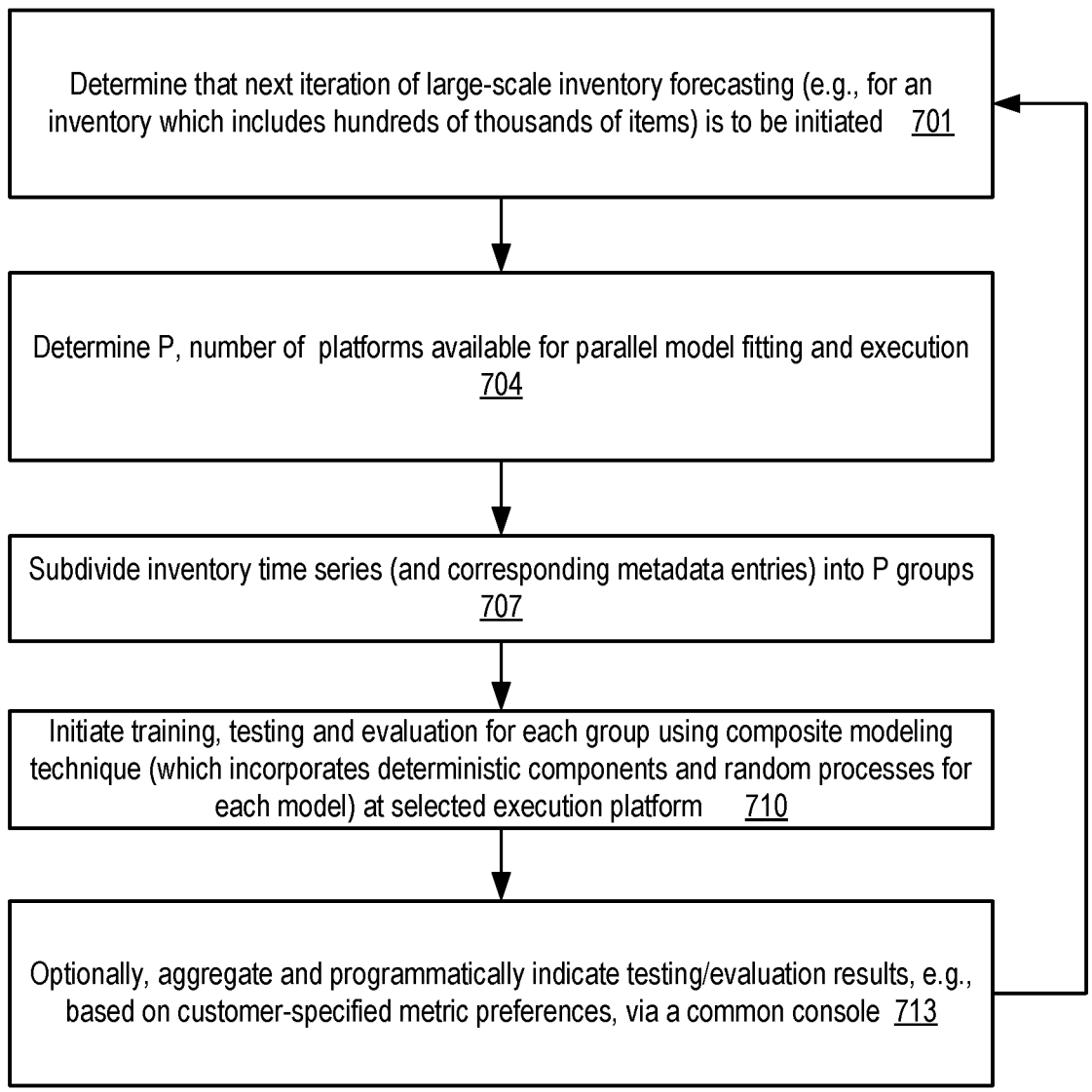
FIG. 7 is a flow diagram illustrating aspects of operations that may be performed to generate forecasts for respective subsets of an inventory using a plurality of execution platforms in parallel, according to at least some embodiments.

FIG. 7 is a flow diagram illustrating aspects of operations that may be performed to generate forecasts for respective subsets of an inventory using a plurality of execution platforms in parallel, according to at least some embodiments. An iteration of inventory-wide forecasts may be generated periodically in the depicted embodiment, e.g., once every D days. As shown in element 701, a determination may be made that the next iteration of forecasts is to be generated for a large-scale inventory which may include hundreds of thousands (or millions) of items, at least some of which may not necessarily sell very frequently.

For the iteration to be performed, the number of execution platforms P on which computations for the forecasts can be performed in parallel may be identified (element 704). The time series representing observed demands or sales for the items of the inventory as well as the feature-related information available for the items may be subdivided into P groups (element 707). Each subset or partition of the input data and features may be transmitted to a respective platform, and a set of composite models (e.g., one model per item) may be trained, tested and evaluated at that platform for that partition (element 710). In some embodiments, the results of the model testing/evaluation, and/or forecasts produced for the future, may be aggregated (as in the case of the aggregated forecasts shown in FIG. 3) and programmatically indicated via a common interface such as a console (element 713). The operations of elements 701-713 may be repeated for each iteration of forecasting. Of course, the number of items for which forecasts are to be generated may change over time as the inventory is enlarged or reduced, and the time series for various items may be trimmed (e.g., to remove older and less useful demand data) between iterations in some embodiments.

It is noted that in various embodiments, at least some operations other than those illustrated in the flow diagrams of FIG. 5, FIG. 6, and FIG. 7 may be used to implement the forecasting techniques described above. Some of the operations shown may not be implemented in some embodiments or may be implemented in a different order, or in parallel rather than sequentially.

Machine Learning Service

Figure 8:
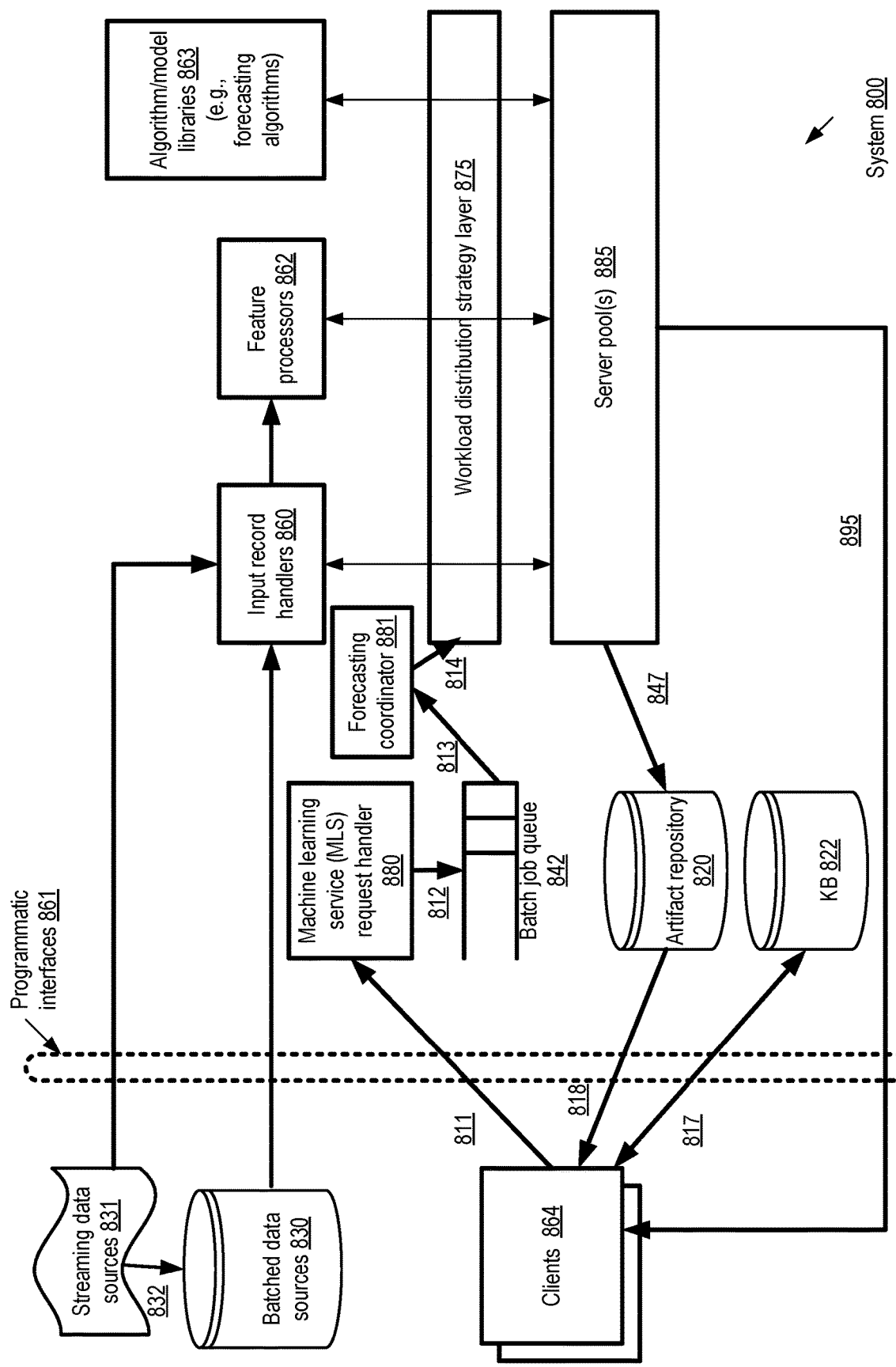
FIG. 8 illustrates example components of a machine learning service which may be used for generating forecasts for time series data, according to at least some embodiments.

In some embodiments, some or all of the forecasting algorithms for intermittent data described above may be implemented at a machine learning service of a provider network. FIG. 8 illustrates example components of a machine learning service which may be used for generating forecasts for time series data, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. The machine learning service of system 800 of FIG. 8 may include numerous physical and/or virtual computing devices, with each such device comprising one or more threads of execution. A large number of such computing devices spread over numerous geographically-dispersed data centers may be used for machine learning tasks or statistical computing tasks in some provider networks.

In the depicted embodiment, input data for various types of analysis (including forecasts for time series) may be obtained from at least two types of sources: batched data sources 830 and streaming data sources 831. In addition to a forecasting coordinator 881 responsible for managing the implementation of the algorithms discussed earlier, the machine learning service (MLS) may comprise a request handler 880, a knowledge base 822 and an artifacts repository 820. The knowledge base 822 may represent a growing collection of entries representing insights gained during earlier instances of the use of forecasting techniques (as well as other algorithms) for a variety of data sets, and may be used to guide some of the decisions made by the forecasting coordinator 881, such as the selection of the particular type of algorithm to be used for a given set of input data, details of the algorithm such as the number of stages to be considered, initialization parameters, etc. The artifacts repository 820 may be used to store interim and/or final results of forecasting operations, values of the parameters selected, and so on.

A set of programmatic interfaces 861 may be implemented at the machine learning service for interactions with clients 864 in the depicted embodiment. The interfaces may include, for example, one or more web-based consoles or web pages, application programming interfaces (APIs), command-line tools, graphical user interfaces (GUIs) or the like. Using interfaces 861, clients 864 may, for example, submit a forecasting request with respect to observation records which can be obtained from a specified data source such as a streaming data source 831 or a batched data source 830. The data source may be identified, for example, by providing access information such as a network address, a database address, and/or a storage device address. In some implementations an SQL-based programmatic interface may be included in programmatic interfaces 861, enabling clients to submit forecast queries (and view results corresponding to such queries) using familiar and easy-to-use interfaces.

In some cases, the raw data records and/or associated metadata (such as the seasonal, price-change related and other metadata discussed earlier with respect to demand data) of a given data set may be pre-processed (e.g., at input record handlers 860 and/or at feature processors 862) before the forecasting algorithms are applied. In such embodiments, demand forecasting may be performed on the pre-processed data set rather than on the raw data records.

In their programmatic interactions with the MLS via interfaces 861, clients 864 may indicate a number of preferences or requirements which may be taken into account when implementing the forecasting algorithms in various embodiments. Examples of such preferences/requirements are discussed below in the context of FIG. 9. Some clients 864 may simply indicate a source of the time series data and leave the analysis and reporting decisions to the MLS; other clients, who are more conversant with the statistics involved or who are experts in the subject matter or domain of the observed data, may provide more detailed guidance or preferences with regard to the forecasting decisions.

The administrative or control plane portion of the MLS may include a request handler 880, which accepts client requests 811, and takes different actions depending on the nature of the analysis requested. For at least some types of requests, the request handler may insert corresponding job objects into batch job queue 842, as indicated by arrow 812. In general, the control plane of the MLS may comprise a plurality of components (including the request handler, the forecasting coordinator, a real-time analytics manager, workload distribution strategy selectors, one or more job schedulers, metrics collectors, and modules that act as interfaces with other services), which may also be referred to collectively as the MLS manager. The data plane of the MLS may include, for example, at least a subset of the servers of pool(s) 885, storage devices that are used to store input data, intermediate results or final results (some of which may be part of the MLS artifact repository), and the network pathways used for transferring client input data and results.

A given batch job object may indicate one or more operations that are to be performed as a result of the invocation of a programmatic interface 861, and the scheduling of a given job may in some cases depend upon the successful completion of at least a subset of the operations of an earlier-generated job. In one embodiment, a client may request that forecasting be performed on a set of observation records (which were originally generated at a streaming data source) in batch mode (e.g., instead of in real time, or in addition to being performed in real time). In such a scenario, as indicated by arrow 832, some or all of the stream data may be stored at a batched data repository. Each batch-mode analysis may be represented by a corresponding job object in the depicted embodiment. For at least some forecasting requests, the original input data may already be available in batch format.

In at least some implementations, job queue 842 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 811, the next job whose dependency requirements have been met may be removed from job queue 842 in the depicted embodiment, as indicated by arrow 813, and a processing plan comprising a workload distribution strategy may be identified for it. With respect to the forecasting iterations discussed in the context of FIG. 7, respective sets of forecasting jobs may be created and queued for each iteration in some embodiments. The workload distribution strategy layer 875, which may also be a component of the MLS control plane as mentioned earlier, may determine the manner in which the lower level operations of the job are to be distributed among one or more compute servers (e.g., servers selected from pool 885), and/or the manner in which the data analyzed or manipulated for the job is to be distributed among one or more storage devices or servers. As indicated by arrow 814, the workload distribution strategy layer 875 may also be utilized by forecasting coordinator 881 in some embodiments, e.g., to help identify the set of servers to be used for the forecasting. For example, as discussed in the context of FIG. 7, in at least one embodiment forecasting for respective partitions of a large inventory may be implemented in a parallelized manner. After the processing plan has been generated and the appropriate set of resources to be utilized for the batch job has been identified, operations may be scheduled on the identified resources. Results of some batch jobs or real-time analyses may be stored as MLS artifacts within repository 820 in some embodiments, as indicated by arrow 847.

In the embodiment shown in FIG. 8, clients 864 may be able to view at least a subset of the artifacts stored in repository 820, e.g., by issuing read requests 818. Results 895 of some analyses (such as probabilistic demand forecasts of the kind discussed earlier) may be made available to clients 864 from server pools 885 via interfaces 861 in some embodiments. Entries may be added to the knowledge base 817 based on input received from clients in the depicted embodiment, and knowledge base entries may also be viewed by the clients in at least some embodiments, as also indicated by arrow 817. Algorithm/model libraries 863 may include a wide variety of machine learning, statistics and data analysis algorithms in addition to the forecasting algorithms discussed above. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

It is noted that at least in some embodiments, a machine learning service infrastructure similar to that shown in FIG. 8 may be set up for internal use within a particular organization or business entity. For example, the customers (represented by clients 864 in FIG. 8) of the forecaster and other components of the MLS may be part of the same business entity which implements the MLS. An Internet-based retailer may utilize such a private machine learning service infrastructure for managing its inventories in some embodiments.

Programmatic Forecast Request Parameters

Figure 9:
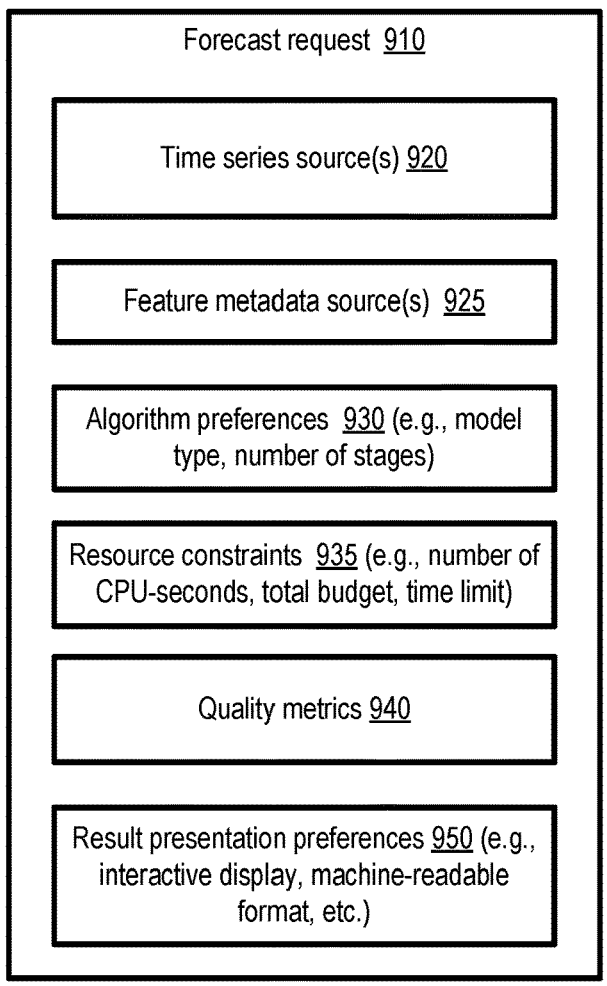
FIG. 9 illustrates example elements of a forecast request which may be transmitted programmatically by a client to a forecaster, according to at least some embodiments.

FIG. 9 illustrates example elements of a forecast request which may be transmitted programmatically by a client to a forecaster, according to at least some embodiments. As shown, a forecast request 910 may include an indication of the demand time series source(s) 920, feature metadata source(s) 925, algorithm preferences 930, resource constraints 935, quality metrics requirements 940 and/or results presentation preferences 945 in the depicted embodiment. The time series and feature metadata sources may include, for example, a set of files, one or more databases, or a network endpoint from which the information may be retrieved by the forecaster when needed. In some embodiments, the algorithm preferences 930 may indicate one or more modeling algorithms or particular variants of algorithms which may work well for the client's data, or a set of algorithm initialization parameters. In some embodiments in which the multi-stage technique described above in the context of FIG. 6 may be employed, the preferences 930 may indicate a targeted number of stages and/or the preferred multi-stage mode.

In at least some embodiments, a forecaster client may be billed based at least in part on the resources consumed for generating the forecast for their input data. In some such scenarios, a client may indicate resource constraints 935 with respect to the forecaster's operations. The constraints may indicate the maximum amount of resources (e.g., expressed in terms of CPU-minutes or other units which may be used in client billing statements) the forecaster is to use to generate forecasts, the total budget (expressed in terms of a currency) available for forecasting, and/or the maximum time to be taken to produce the forecasts. The forecaster may make decisions, such as the selection of the number of model variants to be used to generate the probabilistic forecasts, the number of training/testing iterations, or the number of execution platforms on which forecasting operations are to be performed in parallel, based on the client's resource constraints 935 indicated in the forecast request 910.

In some embodiments clients may provide guidance regarding the particular quality metrics 940 that are of importance to the clients. For example, for some clients and some data sets, the accuracy of the $90^{th}$-percentile demand forecasts with a short lead time (e.g., one week) may be most important, while for other clients the accuracy of the $50^{th}$-percentile forecasts with a longer lead time (e.g., two months) may be more important. Such information may also be useful to the forecaster in making algorithm and parameter selection decisions and/or for preparing evaluation reports for the clients.

Result presentation preferences 950 may indicate, for example, the manner in which the outputs produced by the forecaster are to be provided to specified forecast consumers. Some clients may simply want to view the forecasts via an interactive interface (e.g., a web-based console) which allows clients to zoom in and out to examine various aspects of the forecasts in detail, while other clients may prefer the forecasts to be generated in a machine-readable format which can be provided as input to other automated systems such as an order-generating system.

Not all the elements shown in FIG. 9 may be permitted in client-submitted forecasting requests in some embodiments—for example, the forecaster may be responsible for select the algorithms and parameters in some embodiments. It may sometimes be the case that some of the client preferences may be contradictory with respect to other preferences. For example, the client's resource constraints may not always be compatible with the size of the data set and the algorithm to be used. In some embodiments, a forecaster may be able to indicate that particular combinations of preferences cannot be satisfied, and may suggest to the client that some preferences be modified or overridden by values selected by the forecaster.

Use Cases

The techniques described above, of utilizing a combination of deterministic modeling with innovation state space modeling to generate probabilistic forecasts for intermittent demand data sets, may be extremely useful in a number of scenarios. The inventories of many retailers, including Internet-based retailers, may often include large numbers of relatively infrequently-sold items such as shoes, luggage, clothing, various luxury items, and the like. The time required to replenish supplies of such items may vary—some orders for the items may be fulfilled within a few days, while others may take weeks or months. The forecasting methodology described may be able to predict item-specific demands over various future periods with high confidence levels in a timely manner, without requiring excessive amounts of compute power. Using clusters of execution platforms to generate forecasts for different subsets of the inventory in parallel, demand predictions for inventories which may include millions of items may be generated in a scalable manner. The forecasts produced may be used as input to a number of automated systems, including but not limited to order management systems, discount/promotion planning systems, facilities planning systems, or product placement planning systems for physical (e.g., walk-in) retail locations.

Illustrative Computer System

Figure 10:
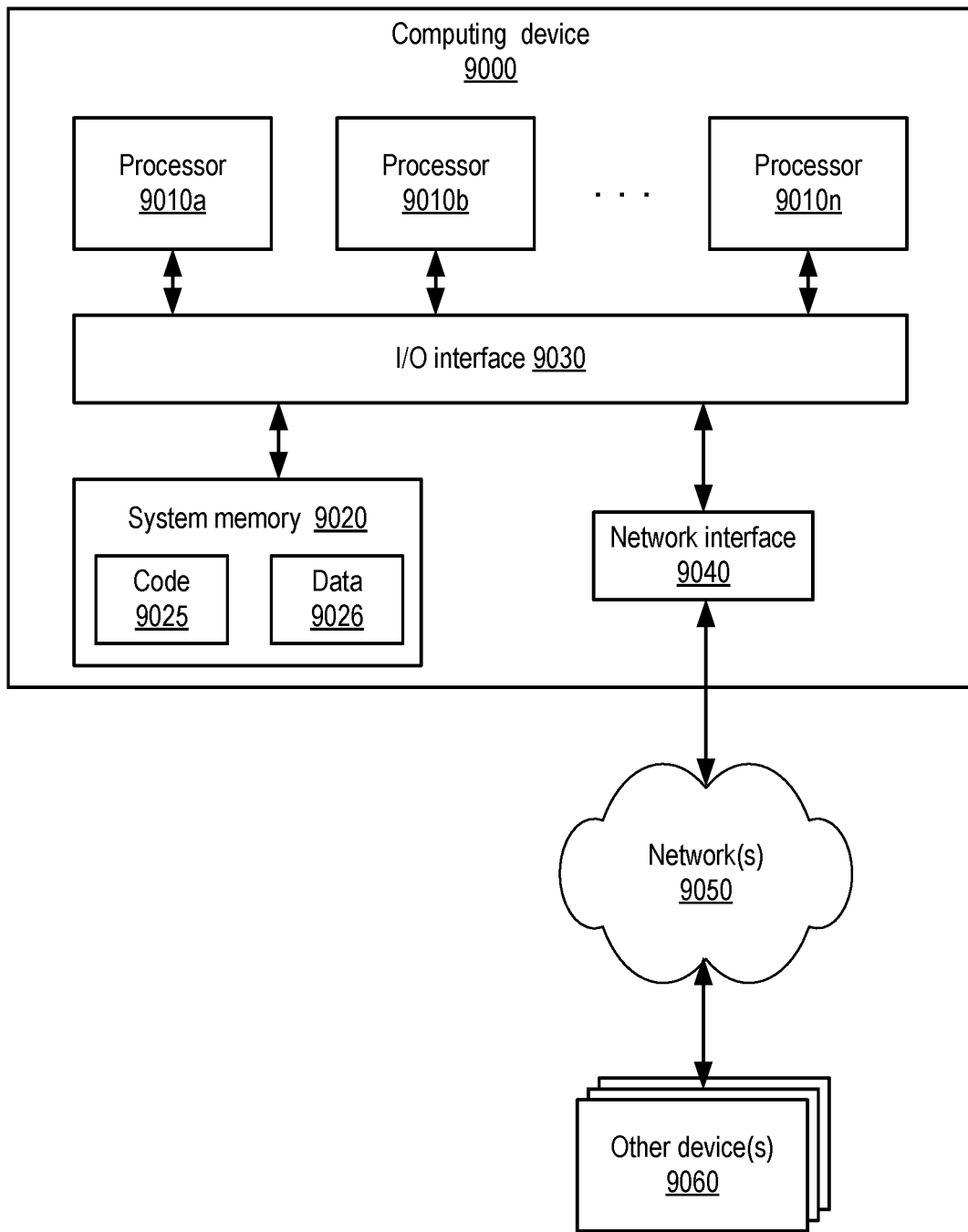
FIG. 10 is a block diagram illustrating an example computing device that may be used in at least some embodiments.

In at least some embodiments, a server that implements a portion or all of one or more of the technologies described herein, including the composite forecasting techniques, as well as various components of a machine learning service may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible forecasting service;
   wherein the one or more computing devices are configured to:
      responsive to a determination that an input data set comprising a time series of demand observations for one or more items meets an intermittency criterion based at least in part on a temporal distribution of demand over time, determine to perform a multi-stage analysis to generate a demand forecast from the time series and:
         generate, with respect to the input data set, a statistical model for the multi-stage analysis to generate the demand forecast, wherein the statistical model utilizes a non-Gaussian likelihood function comprising a plurality of latent functions for predicting a plurality of latent states corresponding to respective stages in the multi-stage analysis, wherein individual ones of the latent functions comprises a combination of a deterministic function component and a random process component, wherein individual ones of the stages employs a respective activity criterion that selects a respective set of active observations in the time series as input for the respective latent function, and wherein the plurality of latent functions includes a first latent function that corresponds to a binary classification stage with respect to a first set of active observations and a second latent function that corresponds to a count regression stage with a second set of active observations;
         perform a machine learning process on the statistics model to fit one or more free parameters of the statistical model to at least a portion of the input data set, wherein the fitting is performed using an approximate Bayesian inference technique;
         determine, using the fitted parameters of the statistical model, one or more probabilistic demand forecasts corresponding to the one or more items, wherein the determination of at least one of the one or more probabilistic demand forecasts includes performance of multiple stages of the multi-stage analysis to predict multiple ones of the latent states; and
         provide, via a programmatic interface, a representation of the one or more probabilistic demand forecasts.

2. The system as recited in claim 1, wherein the random process component comprises an innovation state space model component.

3. The system as recited in claim 1, wherein the approximate Bayesian inference technique comprises obtaining a Laplace approximation for a log likelihood.

4. The system as recited in claim 1, wherein the one or more computing devices are configured to:
   obtain a set of features associated with the demand observations, wherein a particular feature of the set of features comprises one or more of: (a) a holiday-associated demand variation indicator, (b) a seasonality-associated demand variation indicator, (c) a sales promotion indicator, (d) an out-of-stock indicator or (e) a price change indicator; and
   utilize the set of feature values to train the statistical model.

5. The system as recited in claim 1, wherein the one or more computing devices are configured to:
   transmit a representation of a particular probabilistic demand forecast to one or more of: (a) an automated ordering system, wherein the automated ordering system is configured to generate one or more orders for the one or more items based at least in part on the particular probabilistic demand forecast, (b) a discount planning system, (c) a facilities planning system, (d) a promotions planning system, or (e) a product placement planning system for a physical store.

6. A method, comprising:
   performing, by one or more computing devices:
      generating, with respect to an input data set comprising a plurality of observation records of a time series, a statistical model that employs a multi-stage analysis to generate a forecast, wherein the statistical model utilizes a likelihood function comprising a plurality of latent functions for predicting a plurality of latent states corresponding to respective stages in the multi-stage analysis, wherein individual ones of the latent functions comprises a combination of a deterministic component and a random process component, wherein individual ones of the stages employs a respective activity criterion that selects a respective set of active observations in the time series as input for the respective latent function, and wherein the plurality of latent functions includes a first latent function that corresponds to a binary classification stage with respect to a first set of active observations and a second latent function that corresponds to a count regression stage with a second set of active observations;
      performing a machine learning process on the statistics model to fit one or more parameters of the statistical model to at least a portion of the input data set, wherein the fitting is performed using an approximate Bayesian inference technique;
      determining, using the fitted parameters of the statistical model, one or more probabilistic forecasts corresponding to the input data set, wherein the determination of at least one of the one or more probabilistic demand forecasts includes performance of multiple stages of the multi-stage analysis to predict multiple ones of the latent states; and storing a representation of the one or more probabilistic forecasts.

7. The method as recited in claim 6, wherein the random process component comprises an innovation state space model component.

8. The method as recited in claim 6, wherein the approximate Bayesian inference technique comprises obtaining a Laplace approximation for a log likelihood.

9. The method as recited in claim 8, wherein obtaining the Laplace approximation comprises: (a) determining a mode of a posterior and (b) utilizing a Taylor approximation at the mode.

10. The method as recited in claim 8, wherein obtaining the Laplace approximation comprises utilizing a Newton-Raphson optimization algorithm.

11. The method as recited in claim 10, wherein said utilizing the Newton-Raphson optimization algorithm comprises utilizing a variant of Kalman smoothing.

12. The method as recited in claim 6, further comprising:
selecting, from a pool of nodes of a computation cluster, a particular node at which said fitting is to be performed; and
initiating said fitting at the particular node.

13. The method as recited in claim 6, wherein:
the observation records in the input data set are demand observations for a particular item; and
the count regression stage is the final stage in the multi-stage analysis and forecasts a next demand for the particular item in the time series.

14. The method as recited in claim 13, wherein:
the first latent function of the binary classification stage is configured to forecast whether the next demand for the particular item is zero or non-zero.

15. The method as recited in claim 6, wherein the random process component comprises a representation of (a) a level component of a latent state, (b) a growth component of the latent state and (c) a damping parameter associated with the growth component.

16. A non-transitory computer-accessible storage medium storing program instructions that when executed on one or more processors cause the one or more processors to:
generate, with respect to an input data set comprising a plurality of observation records of a time series, a statistical model that employs a multi-stage analysis to generate a forecast, wherein the statistical model utilizes a likelihood function comprising a plurality of latent functions for predicting a plurality of latent states corresponding to respective stages in the multi-stage analysis, wherein individual ones of the latent functions comprises a combination of a deterministic component and a random process component, wherein individual ones of the stages employs a respective activity criterion that selects a respective set of active observations in the time series as input for the respective latent function, and wherein the plurality of latent functions includes a first latent function that corresponds to a binary classification stage with respect to a first set of active observations and a second latent function that corresponds to a count regression stage with a second set of active observations;

perform a machine learning process on the statistics model to fit one or more parameters of the statistical model to at least a portion of the input data set, wherein the fitting is performed using an approximate Bayesian inference technique;

determine, using the fitted parameters of the statistical model, one or more probabilistic forecasts corresponding to the input data set, wherein the determination of at least one of the one or more probabilistic demand forecasts includes performance of multiple stages of the multi-stage analysis to predict multiple ones of the latent states; and store a representation of the one or more probabilistic forecasts.

17. The non-transitory computer-accessible storage medium as recited in claim 16, wherein the random process component comprises an innovation state space model component.

18. The non-transitory computer-accessible storage medium as recited in claim 16, wherein the approximate Bayesian inference technique comprises obtaining a Laplace approximation for a log likelihood.

19. The non-transitory computer-accessible storage medium as recited in claim 16, wherein individual ones of the observation records correspond to demands for one or more items, and wherein the instructions when executed on the one or more processors cause the one or more processors to:
obtain a set of features associated with the observation records, wherein a particular feature of the set of features comprises one or more of: (a) a holiday-associated demand variation indicator, (b) a seasonality-associated demand variation indicator, (c) a sales promotion indicator, (d) an out-of-stock indicator or (e) a price change indicator; and
utilize the set of feature values to train the statistical model.

20. The non-transitory computer-accessible storage medium as recited in claim 19, wherein the instructions when executed on the one or more processors cause the one or more processors to:
subdivide the set of features into multiple groups and train, based on a composite modeling technique, a respective statistical model for each group.

21. The non-transitory computer-accessible storage medium as recited in claim 16, wherein the likelihood function is Gaussian.

22. The non-transitory computer-accessible storage medium as recited in claim 16, wherein the deterministic component comprises a non-linear function.

23. The non-transitory computer-accessible storage medium as recited in claim 22, wherein the non-linear function comprises a neural network.

24. The non-transitory computer-accessible storage medium as recited in claim 16, wherein the statistical model utilizes a twice-logistic link function.

* * * * *